(12) United States Patent
Terada et al.

(10) Patent No.: US 12,018,735 B2
(45) Date of Patent: Jun. 25, 2024

(54) SWING-TYPE SPEED REDUCER

(71) Applicants: UNIVERSITY OF YAMANASHI, Yamanashi (JP); AD ROBO CO. LTD., Kanagawa (JP)

(72) Inventors: Hidetsugu Terada, Yamanashi (JP); Takeshi Nagai, Kanagawa (JP)

(73) Assignees: UNIVERSITY OF YAMANASHI, Yamanashi (JP); AD ROBO CO. LTD., Kanagawa (JP)

( * ) Notice: Subject to any disclaimer, the term of this patent is extended or adjusted under 35 U.S.C. 154(b) by 0 days.

(21) Appl. No.: 17/754,823

(22) PCT Filed: Sep. 23, 2020

(86) PCT No.: PCT/JP2020/035827
§ 371 (c)(1),
(2) Date: Apr. 13, 2022

(87) PCT Pub. No.: WO2021/075218
PCT Pub. Date: Apr. 22, 2021

(65) Prior Publication Data
US 2024/0102538 A1 Mar. 28, 2024

(30) Foreign Application Priority Data
Oct. 15, 2019 (JP) .................................. 2019-188761

(51) Int. Cl.
*F16H 25/06* (2006.01)
*F16H 13/04* (2006.01)

(52) U.S. Cl.
CPC ............. *F16H 13/04* (2013.01); *F16H 25/06* (2013.01)

(58) Field of Classification Search
CPC ................................. F16H 13/04; F16H 25/06
See application file for complete search history.

(56) References Cited

U.S. PATENT DOCUMENTS

| 3,145,574 A * | 8/1964 | Morgan | F16H 25/06 74/63 |
| 2003/0154814 A1* | 8/2003 | Irie | F16H 57/12 74/490.01 |
| 2006/0117879 A1* | 6/2006 | Ganser | F16H 25/16 74/63 |

FOREIGN PATENT DOCUMENTS

JP 2003278875 A * 10/2013 ............. F16H 13/04

* cited by examiner

*Primary Examiner* — William C Joyce
(74) *Attorney, Agent, or Firm* — Taro Yaguchi (57) ABSTRACT

A swing speed reducer comprising: a main body; an input shaft that is rotatably held in the main body; a precession body that precesses; a swinging body that engages with the precession body and is swung by the precession; and an output shaft that is rotated by the swing of the swinging body; wherein a precession annular groove for precession of the precession body and a swinging annular groove for swinging the swinging body are provided on the surface of a spherical portion.

4 Claims, 8 Drawing Sheets

SWING-TYPE SPEED REDUCER

FIELD OF THE INVENTION

The present invention pertains, for example, to a speed reducer that rotationally transmits the movement of an input shaft to an output shaft at a reduced speed. In particular, the present invention pertains to a swing-type speed reducer in which the input shaft and output shaft have a greater cross angle, thus eliminating drive mechanism offset and enabling a more compact configuration in robot arms and the like, and which can be made to approximate articulatory motion in humans, animals, and so forth.

BACKGROUND OF THE INVENTION

Typical examples of right-angle speed reducers include gear mechanisms such as bevel gears, skew bevel gears, and worms and worm gears. Such speed reducers also include drives that utilize a single mechanism to perform reduction, and drives that employ a combination of typical coaxial swing-type speed reducer mechanisms. These speed reducers are used in numerous fields, such as robot joints.

PRIOR ART LITERATURE

Patent Literature

[Patent Document 1] Japanese Patent No. 3790715
[Patent Document 2] Japanese Patent No. 3711338

SUMMARY OF THE INVENTION

Some such speed reducers that comprise bevel gear mechanisms have right angles or cross angles and intersecting axes; however, gear backlash naturally occurs when gear mechanisms are employed, thus reducing precision during actuation, and inevitably creating noise.

Moreover, because speed reduction is effected through the ratio of the input and output tooth counts in these gear mechanisms, gears having a large ratio must be used in order to obtain a large reduction ratio, thus necessitating a large space. Moreover, because the gears intermesh at a position offset from the shafts, only a few teeth are simultaneously intermeshed. Such mechanisms also present problems such as reduced precision of rotation or position resulting from play between gears, shaft deflection, and so forth; and a tendency to produce noise when rotating.

The inventors of the present application have proposed swing-type speed reducers having a right angle or a large cross angle wherein, as illustrated in patent documents 1 and 2, a rotational input is converted to precessional motion by a spherical precession body (the respective swinging bodies in the documents), then to rotational motion in an output shaft at a right angle to the axis by an output swinging body that engages with and is swung by part of the spherical surface of the precession body.

These swing-type speed reducers are capable of reducing backlash to infinitely close to zero and are structurally capable of producing large reduction ratios, enabling greater miniaturization of the device as a whole than a bevel gear mechanism or the like would.

Although the swing-type speed reducers disclosed in patent documents 1 and 2 allow for greater miniaturization than a bevel gear mechanism or the like would, recently there has been a demand for even more compact joint mechanisms for robot arms and the like.

The inventors of the present application attempted to fabricate a speed reducer that was even more compact than existing swing-type speed reducers, but found it difficult to form annular grooves that serve as tracks for the rolling ball elements needed to drive the precession body and output swinging body in existing mechanisms.

An object of the present invention is to provide a swing-type speed reducer having a large cross angle that enables greater miniaturization than existing speed reducers.

In order to achieve this object, a swing-type speed reducer according to the present invention provides a speed reducer comprising: an input shaft rotatably supported by a main body around an input axis extending in the X-axis direction of the device in an X-Y-Z coordinate system; a precession body comprising a spherical portion and a pair of precessional shafts projecting from both sides of the spherical portion along a precession axis passing through the center the spherical portion, with one of the precessional shafts being held by the input shaft so as to be capable of precessing around the X-axis; a precession supporter for supporting the precession body so as to enable precessional motion of the precession body relative to the main body, wherein the precession supporter is anchored to the main body; a swinging body that, in the Z-axis direction, engages with the surface of the precession body on the opposite side from the precession supporter and is swung by the precessional motion of the precession body; an swing motion supporter that engages with the swinging body and supports the swing motion of the swinging body relative to the main body; and an output shaft rotatably supported by the main body around the Z-axis direction, wherein the output shaft engages with the swinging body so as to be rotated by the swing motion of the swinging body, wherein an annular precession groove that follows a locus traced between the precession body and the precession supporter when the precession body is in precessional motion is provided in the surface of the precession body facing the precession supporter, and precessional ball element that rolls through the annular precession groove is rotatably held by the precession supporter, wherein an annular swing groove that causes the swinging body to swing in the circumferential direction around the Z-axis and in the Z-axis direction when the precession body is in precessional motion is provided in the surface of the precession body facing the swinging body, and a ball element for swing motion that rolls through the annular swing groove is rotatably held by the surface of the swinging body facing the precession body, wherein a swing guide groove for guiding the swing motion of the swinging body is provided in the surface of the swinging body facing the swing motion supporter, and a swing motion guide ball element that rolls through the swing guide groove is rotatably held by the swing motion supporter; and wherein an undulating groove formed by a plurality of continuous arc-shaped grooves for one period of the swing motion of the swinging body is provided around the entire circumference of the surface of the swinging body facing the output shaft, and output ball elements that roll through the undulating groove are rotatably held by the output shaft.

In the swing-type speed reducer of the present invention, the rotation of the input shaft causes the precession body to engage in precession, which is converted by the swinging body to swing motion, which is converted by the undulating groove and the output ball elements to rotational motion of the output shaft. As a result of this configuration, the precession body engages in one period of precession for every rotation of the input shaft, this one period of precession causes the swinging body to engage in one period of swing motion, and this one period of swing motion causes the output shaft to rotate for one period worth of arc-shaped grooves, making a large reduction ratio easily obtainable.

In the swing-type speed reducer of the present invention, the annular precession groove, the annular swing groove, and the undulating groove must be precision-machined for the smooth movement. In the present invention, the annular precession groove and the annular swing groove are provided in the surface of the spherical precession body, and the undulating groove is provided in the surface of the swinging body. Previously, these grooves were provided in the inner circumferential surfaces of the elements, making them difficult to machine and impeding further miniaturization. Compared to previous devices of this sort, the present invention makes it easier to machine these grooves and makes it possible to realize an even more compact swing-type speed reducer than before.

In the swing-type speed reducer of the present invention, the precession supporter may be mounted on the main body via an elastic member and provided with a precession-biasing means for biasing the precessional ball elements toward the annular precession groove. In this configuration, the precession supporter biases the precession body via the precession-biasing means when the precession body is in precessional motion, thus enabling smooth precession.

In this configuration, the precession supporter may be configured to bias the precessional ball elements in the annular precession groove toward the center of the spherical portion. Such an arrangement makes it possible to uniformly disperse any loads placed upon the precessional ball elements.

In the swing-type speed reducer of the present invention, the swing motion supporter may be mounted on the main body via an elastic member and provided with a swing motion biasing means for biasing the swing motion guide ball elements toward the swing guide groove. In this configuration, the swing motion supporter is provided with the swing motion biasing means for biasing the swing motion guide ball elements toward the swing guide groove when the swinging body swings, thereby enabling smooth swing motion.

In accordance with the present invention, it is possible to provide a swing-type speed reducer having a large cross angle that enables greater miniaturization than existing speed reducers.

DETAILED DESCRIPTION OF THE INVENTION

Next, a swing-type speed reducer constituting an exemplary embodiment of the present invention will be described with reference to FIGS. 1-10.

Figure 1:
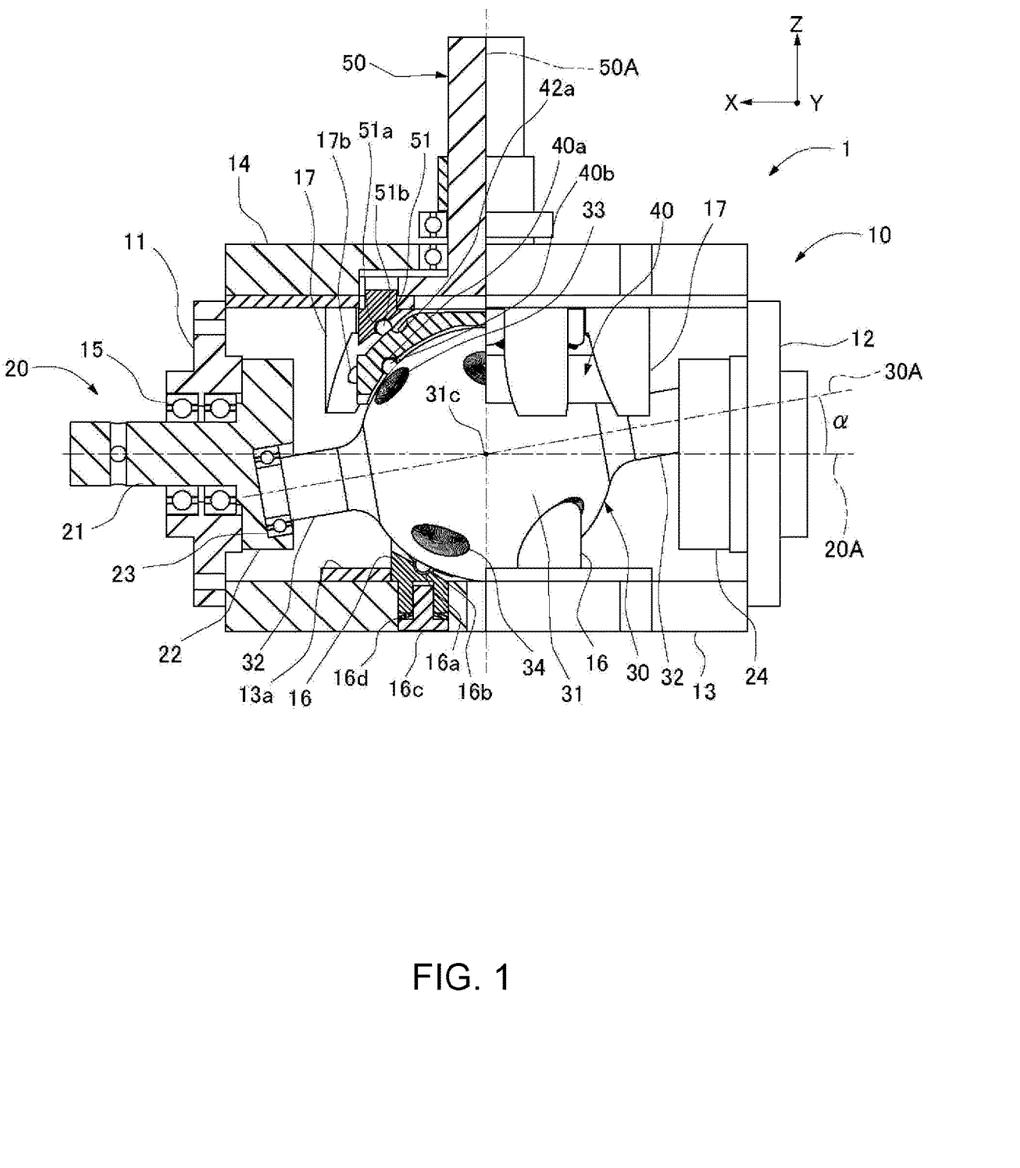
FIG. 1 A partial cross-sectional view of a swing-type speed reducer according to an embodiment of the present invention.

As shown in FIG. 1, a swing-type speed reducer 1 according to the present embodiment comprises, in an X-Y-Z coordinate system, a main body 10 housing the device as a whole, an input shaft 20 rotatably held by the main body 10 around an input axis 20A, a precession body 30 that is precessed by the rotation of the input shaft 20, a swinging body 40 that engages with the precession body 30 at a position above the precession body 30 in the Z-axis direction and is swung by the precession thereof, and an output shaft 50 that is rotated around the Z-axis by the swing motion of the swinging body 40.

Figure 2A:
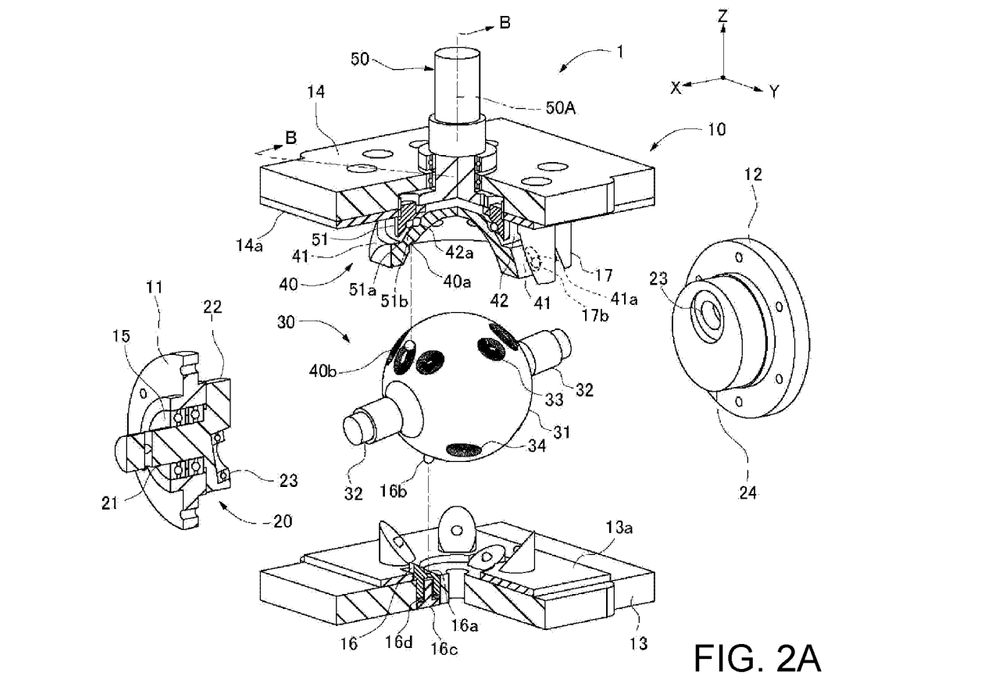
FIG. 2A is an exploded view of the swing-type speed reducer in FIG. 1.
Figure 2B:
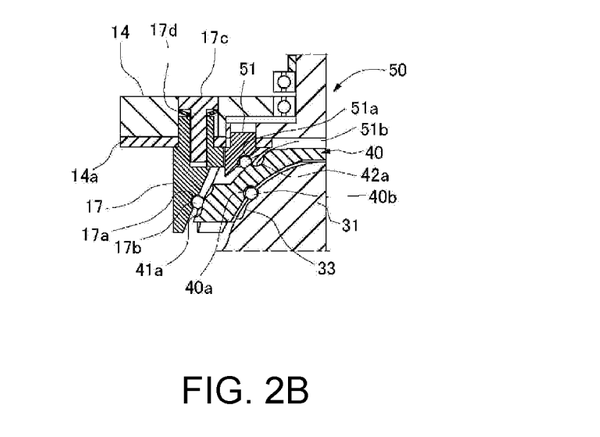
FIG. 2B is a magnified cross-sectional view along line B-B in FIG. 2A.

As shown in FIGS. 1 and 2, the main body 10 comprises a front plate 11 that rotatably supports the input shaft 20, a rear plate 12 that is provided on the opposite side from the input shaft 20, a bottom plate 13 provided on a bottom surface, and a top plate 14 provided on a top surface. The shape of the main body 10 can be modified according to the device in which it will be used, such as a robot arm joint.

The input shaft 20 comprises a shaft part 21 that is held by the front plate 11 via an input bearing 15, and an eccentric part 22 that rotatably holds one precessional shaft 32 of the precession body 30 at a position eccentric to the input axis 20A extending in the X-axis direction. In the eccentric part 22, the distal end of the precessional shaft 32 is rotatably held by the precession bearing 23. The rotation of the input shaft 20 causes the eccentric part 22, which is integrated with the shaft part 21, to also rotate, thereby causing the precessional shaft 32 eccentrically to rotate, making it possible to set the precession body 30 in precession.

The precession body 30 comprises a spherical portion 31 and a pair of precessional shafts 32 that project from both sides of the spherical portion 31 along a precession axis 30A that passes through a center 31C of the spherical portion 31. The precession axis 30A extends forward and rearward in the X-axis direction at an angle α of eccentricity. In this embodiment, angle α is 10°.

The precessional shaft 32 on the left in FIG. 1 is supported by the precession bearing 23 provided on the eccentric part 22 of the input shaft 20. The precessional shaft 32 on the right in FIG. 1 is held by an eccentric bearing 24, configured similarly to the eccentric part 22 of the input shaft 20, so as to be capable of eccentric rotation (precession) with respect to the main body 10.

Figure 3A:
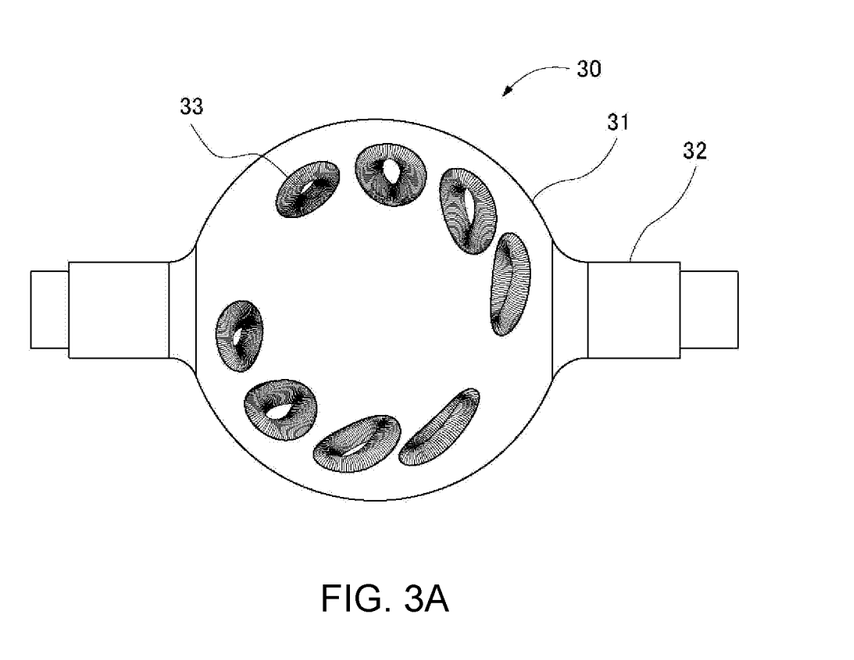
FIG. 3A is an explanatory illustration of an annular swing groove provided in an upper surface of a spherical portion of a precession body.

Annular swing grooves 33 are formed in the upper surface of the spherical portion 31, as shown in FIG. 3A. The annular swing grooves 33 guide the swinging body 40 to swing in the circumferential direction and the Z-axis direction around an output axis 50A in the Z-axis direction when the precession body 30 is in precession. In this embodiment, annular swing grooves 33 are formed at eight places in the upper surface of the spherical portion 31. In the present application, multiple fine lines are used to represent the shapes of the annular swing grooves 33, etc., in some of the drawings.

Figure 3B:
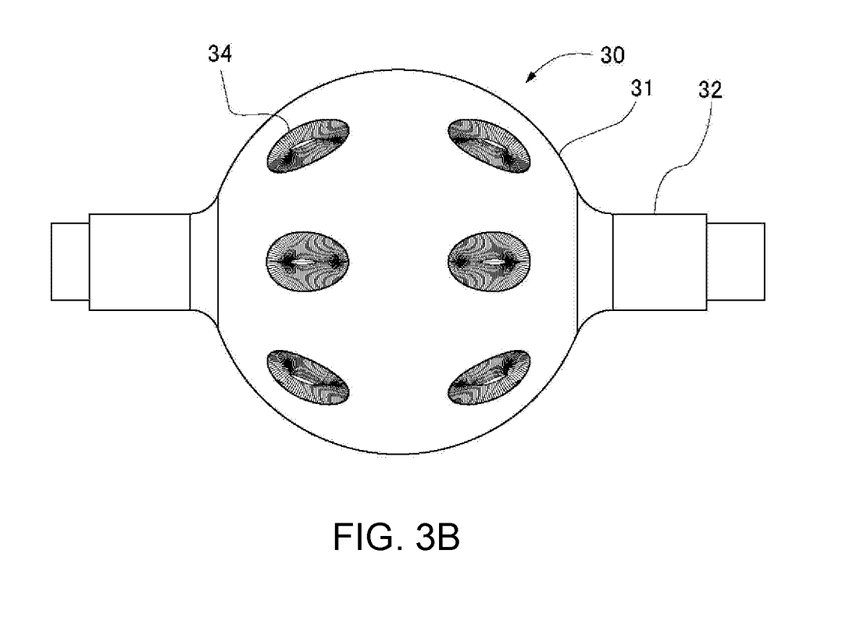
FIG. 3B is an explanatory illustration of an annular precession groove provided in a lower surface of the spherical portion.

Annular precession grooves 34 are formed in the lower part of the spherical portion 31, as shown in FIG. 3B. The annular precession grooves 34 are formed in the shape of loci traced between the surface of the spherical portion 31 and precession supporters 16 to be described below when the precession body 30 is in precession. In this embodiment, annular precession grooves 34 are formed at six places in the lower surface of the spherical portion 31.

Referring to FIGS. 1 and 2A, a precession supporter 16 that supports the precession body 30 is anchored to the bottom plate 13 below the spherical portion 31. In this embodiment, a total of six precession supporters 16, two in the X-axis direction and two apiece to the left and right (Y direction), are provided in alignment with the positions of the annular precession grooves 34 (see FIG. 2A).

The precession supporters 16 have the shape of cylinders that have been cut on the diagonal, and have recesses 16a formed in the diagonal faces thereof. Precessional ball elements 16b made by metal balls are rotatably held in the recesses 16a. The precessional ball elements 16b roll in contact with the annular precession grooves 34 when the precession body 30 is in precession.

As shown in FIG. 1, the precession supporters 16 are mounted on anchoring elements 16c that are anchored in through-holes in the bottom plate 13, with disc springs 16d constituting precession biasing means being disposed between the precession supporters 16 and the anchoring elements 16c. As a result of this configuration, the precession supporters 16 are formed to bias the precessional ball elements 16b toward the annular precession grooves 34 in the precession body 30 through the elasticity of the disc springs 16d, which are elastic members.

In addition, the precession supporters 16, like the swing motion supporters 17 to be described below (see FIG. 4), are machined so that the outer circumferential surfaces of the sides thereof anchored to the anchoring elements 16c are D-shaped, and are kept from rotating by a guide plate 13a anchored to the surface of the bottom plate 13.

Figure 4:
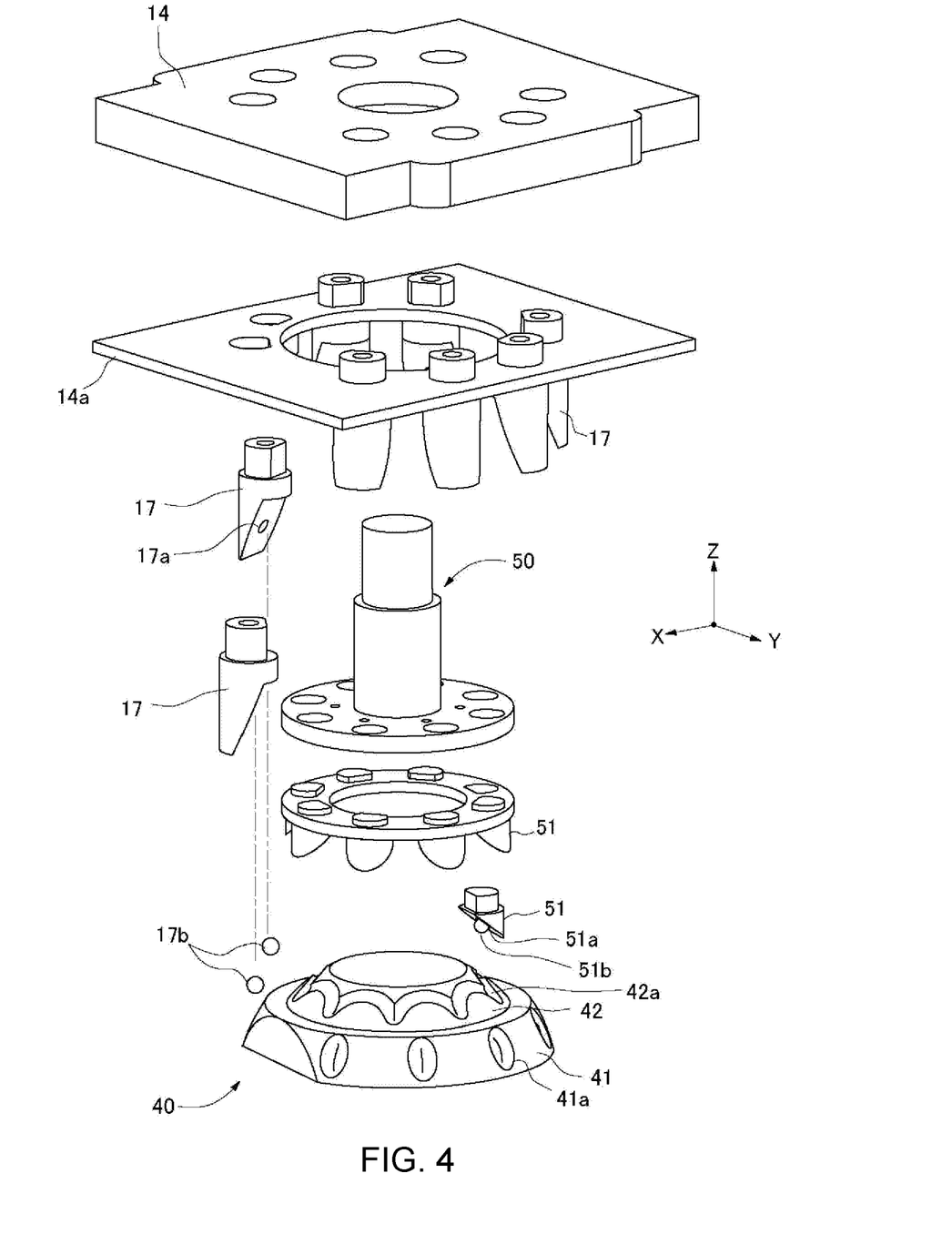
FIG. 4 An exploded view of various elements positioned above the precession body of the swing-type speed reducer in FIG. 1.
Figure 5A:
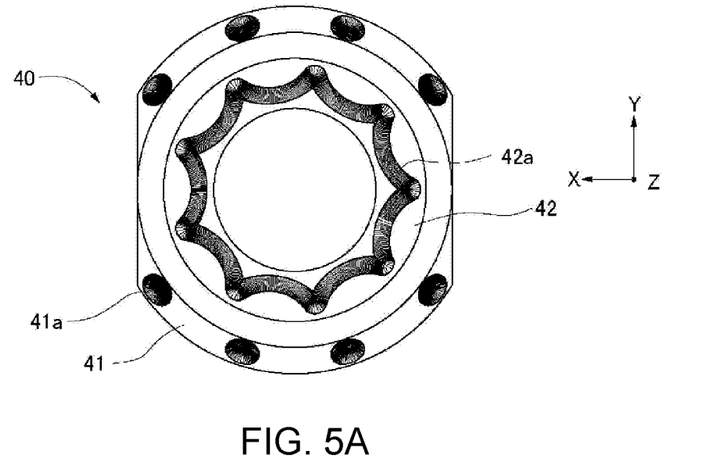
FIG. 5A-5C are explanatory illustrations of the configuration of the swinging body in the present embodiment.
Figure 5B:
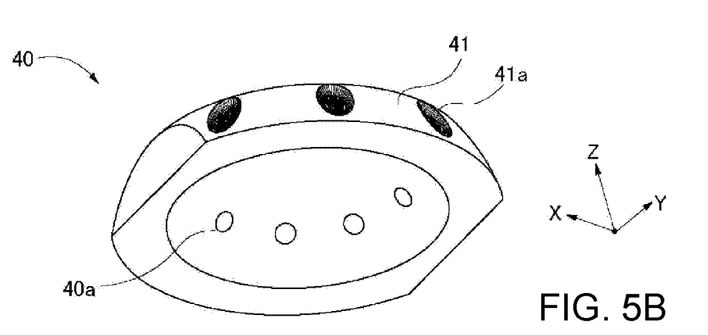
Figure 5C:
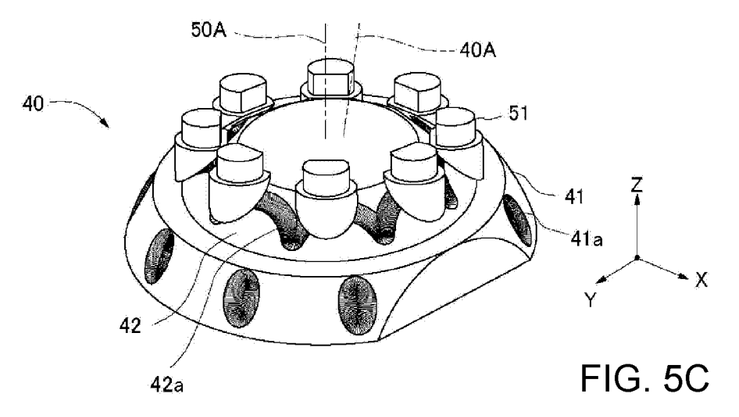

The swinging body 40 is formed in an overall dome-like shape, as shown in FIGS. 4 and 5. Hemispherical recesses 40a are provided in the inner circumferential surface thereof, as shown in FIG. 5B. In this embodiment, the recesses 40a are provided at eight locations, and ball elements for swing motion 40b are rotatably held in the recesses 40a.

A supported part 41 that is supported by the swing motion supporters 17 and a guide 42 that is contacted by an output supporter 51 of the output shaft 50 via output ball elements 51b are formed in the upper surface of the swinging body 40. Swing guide grooves 41a that guide the swing motion of the swinging body 40 are formed in the supported part 41. An undulating groove 42a for converting the swing motion of the swinging body 40 to rotational motion of the output shaft 50 is formed in the guide 42.

As shown in FIGS. 5A-5C, the swing guide grooves 41a provided in the supported part 41 of the swinging body 40 are shaped like ellipses the major axes of which lie along the Z-axis direction. Swing motion guide ball elements 17b held by the swing motion supporters 17 contact the swing guide grooves 41a to guide the swing motion of the swinging body 40.

The swing motion supporters 17 have the shape of cylinders that have been cut on the diagonal, and have recesses 17a formed in the diagonal faces thereof, as shown in FIG. 4. The swing motion guide ball elements 17b are rotatably held in the recesses 17a.

As shown in FIG. 2B, the swing motion supporters 17 are mounted on anchoring elements 17c that are anchored in through-holes in the top plate 14, with disc springs 17d constituting swing motion biasing means being disposed between the swing motion supporters 17 and the anchoring elements 17c. As a result of this configuration, the swing motion supporters 17 bias the swing motion guide ball elements 17b toward the swing guide grooves 41a in the swinging body 40 through the elastic force of the disc springs 17d, which are elastic members.

As shown in FIG. 5A, the undulating groove 42a provided in the guide 42 of the swinging body 40 is constituted by nine arc-shaped grooves 42b that are continuous in the circumferential direction and shift the output ball elements 51b in the circumferential direction by one period worth of swing motion of the swinging body 40. The undulating groove 42a is contacted by the output ball elements 51b, which are rotatably held in recesses 51a in the output supporters 51 provided on the output shaft 50.

In this embodiment, nine arc-shaped grooves 42b, corresponding to one period, are formed around the entire circumference of the guide 42, as shown in FIG. 5A. The eight output supporters 51 mounted on the output shaft 50 contact the undulating groove 42a via the output ball elements 51b, as shown in FIGS. 4 and 5C. The output supporters 51 have the shape of cylinders that have been cut on the diagonal, and the recesses 51a are formed in the diagonal faces thereof. The output ball elements 51b are rotatably held in the recesses 51a.

Figure 6:
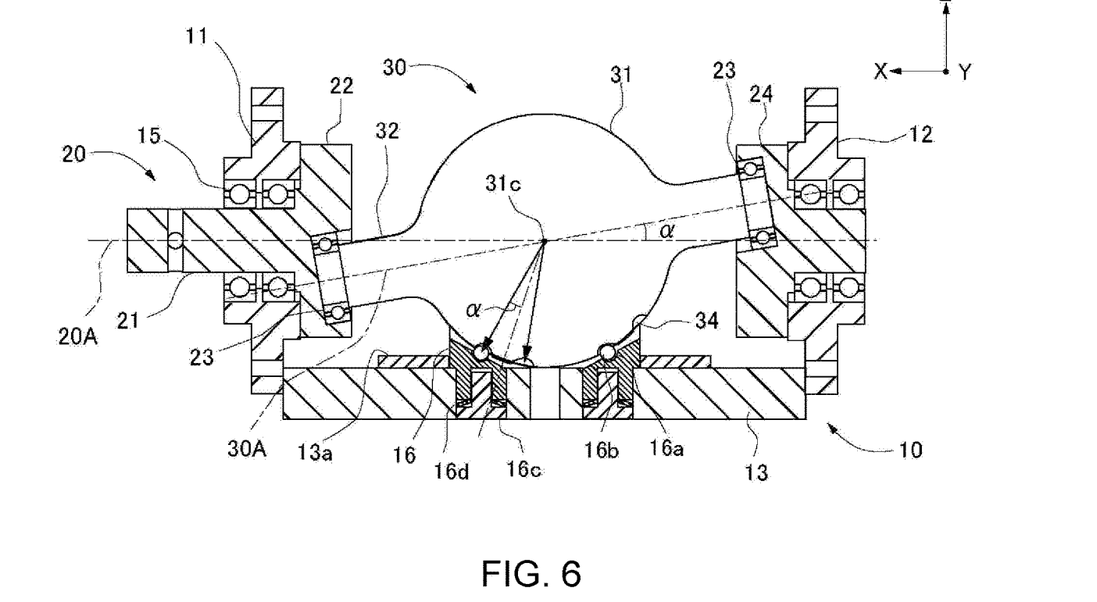
FIG. 6 A cross-sectional view illustrating the configuration of the annular precession groove of the precession body.
Figure 7:
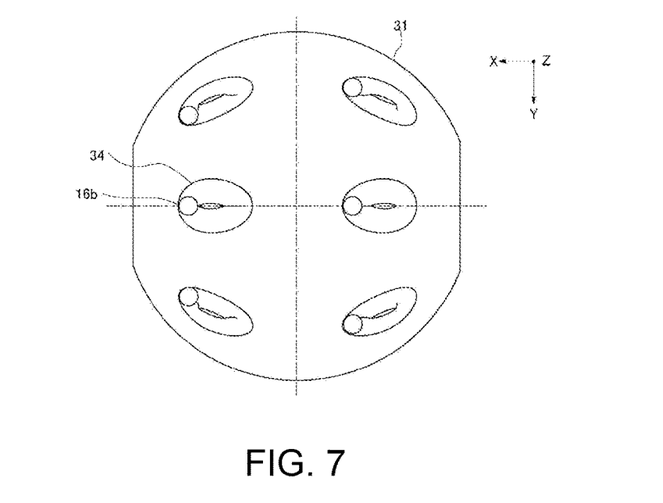
FIG. 7 An explanatory illustration of the relationship between annular precession grooves and precessional ball elements on the lower surface of the spherical portion.

Next, the relationship between the annular precession grooves 34 and the precessional ball elements 16b when the precession body 30 is in precession will be described with reference to FIGS. 6 and 7. In the state illustrated in FIG. 6, the precessional shaft 32 on the left is at its lowest position in the Z-axis direction. The positional relationship between the annular precession grooves 34 and the precessional ball elements 16b in this state, which illustrates their initial positions, is shown in FIG. 7.

The annular precession grooves 34 show the locus of the surface of the spherical portion 31 of the precession body 30 with respect to fixed points (in this case, the precessional ball elements 16b) obtained when rotated at an angle α of the precession axis 30A to the input axis 20A of the input shaft 20.

Specifically, defining $P_1$ as the coordinate position of the surface of the spherical portion 31 after the input shaft 20 has been rotated to an angle θ(°) from the initial position, and $P_2$ as position $P_1$ transformed to coordinates on the precession axis 30A, the respective coordinates are expressed by the following formulas.

$$P_1 = P_o \cdot E^{20A \cdot \theta} \quad (1)$$

$$P_2 = P_1 \cdot E^{30A(-\theta)} \quad (2)$$

In formulas (1) and (2), E is a transformation matrix for the rotation θ of the input shaft 20 around the input axis 20A. The annular precession grooves 34 are formed by machining the surface of the spherical portion 31 along the loci expressed by the formulas using a tool identical in shape to the precessional ball elements 16b.

Next, the annular swing grooves 33 in the spherical portion 31 of the precession body 30 will be described with reference to FIG. 8. The annular swing grooves 33 have loci for causing the swinging body 40 to swing from the precession of the precession body 30 via the ball elements for swing motion 40b rotatably held in the recesses 40a in the swinging body 40.

Figure 8:
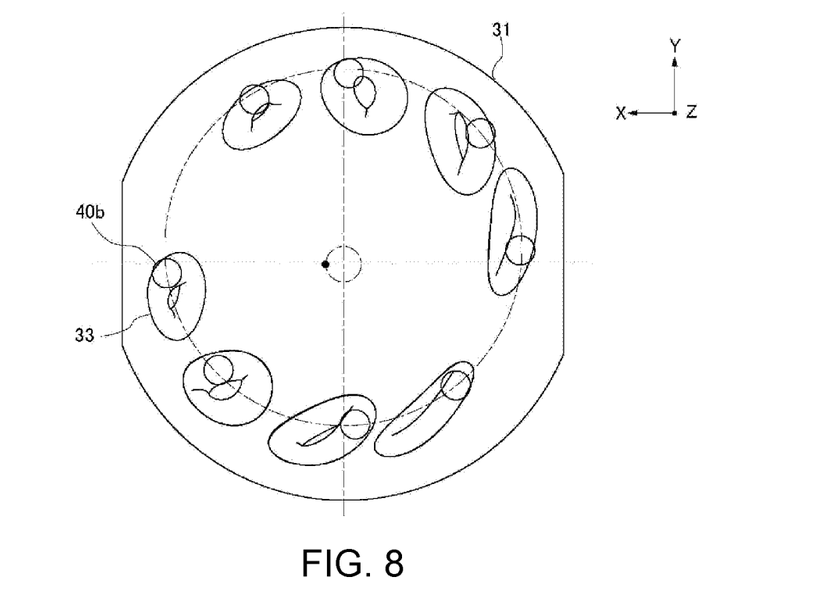
FIG. 8 An explanatory illustration of the relationship between annular swing grooves and ball elements for swing motion on the upper surface of the spherical portion.

As shown in FIG. 8, eight annular swing grooves 33 are provided, each having a different shape. First, taking the state shown in FIG. 8 as the initial position, the positions thereof when the input shaft 20 is rotated to an angle θ are calculated, and then said positions transformed to coordinates with respect to the swing motion axis 40A of the swinging body 40 (see FIG. 5C) are calculated, and the loci are determined. These loci are intermediate imaginary loci that do not have actual tangible form in the final product, and are circular in shape.

The loci of the annular swing grooves 33 of the precession body 30 are obtained by subtracting the precession of the precession body from these imaginary loci. The loci are calculated by repeatedly calculating coordinates using a transformation matrix as in the annular precession groove 34 calculation procedure described above to calculate loci for one period. As the specific method is similar to that used in patent document 1, detailed description thereof will be omitted herein.

Next, the relationship of the undulating groove 42a in the swinging body 40 and the output ball elements 51b will be described with reference to FIG. 9. The positions of the output ball elements 51b in FIG. 9 indicate the initial positions thereof when the precession body 30 is in the state shown in FIG. 1. In this state, one of the eight output ball elements 51b is positioned at an intersection 42b1 between two of the arc-shaped grooves 42b on the left end in FIG. 9, out of the nine arc-shaped grooves 42b forming the undulating groove 42a.

Figure 9:
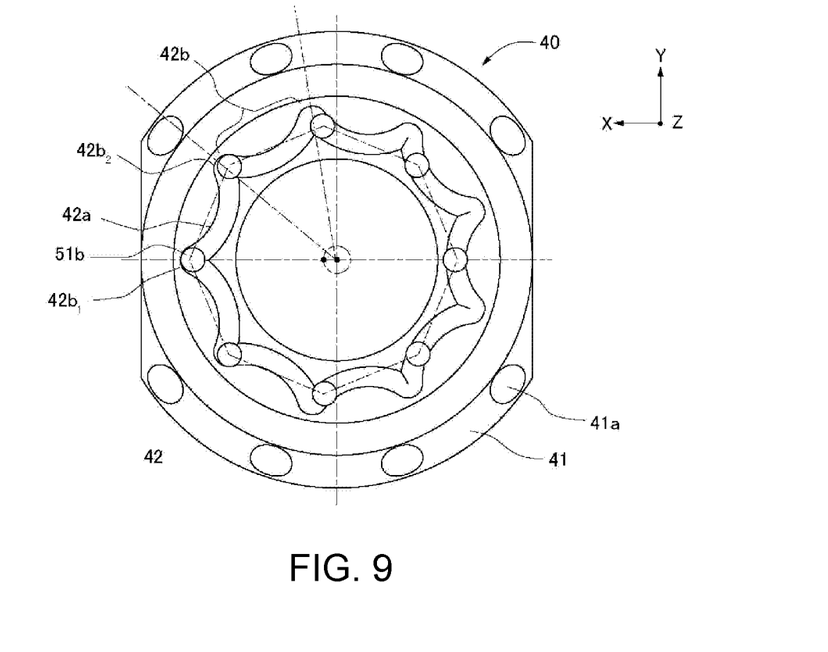
FIG. 9 An explanatory illustration of the relationship between an undulating groove and output ball elements on the upper surface of a swinging portion.

As shown in FIG. 9, there is one fewer output ball elements 51b than there are arc-shaped grooves 42b; thus, the positions of the output ball elements 51b are increasingly offset toward the right. When the input shaft 20 rotates once from the state shown in FIG. 9, the swinging body 40 swings once, thereby causing the output ball elements 51b to roll through the arc-shaped grooves 42b, and as a result, the output ball element 51b that had been on the left end moves to an intersection 42b2 of the arc-shaped grooves 42b to the upper right. As the input shaft 20 is rotated further, the process described above occurs in succession until returning to the initial positions shown in FIG. 9 after the input shaft 20 has been rotated nine times, the same as the number of arc-shaped grooves 42b.

In this way, the number of arc-shaped grooves 42b in the undulating groove 42a becomes the reduction ratio of the output shaft 50 relative to the input shaft 20. Thus, the number of arc-shaped grooves 42b should be increased if a greater reduction ratio is desired. The method used to form the undulating groove 42a is similar to that used in patent document 1; thus, detailed description thereof will be omitted herein.

In the swing-type speed reducer 1 according to this embodiment, the rotation of the input shaft 20 causes the precession body 30 to precess, and the swinging body 40 engaged with the precession body 30 to swing. The swing motion of the swinging body 40 is then converted to rotation of the output shaft 50 by the mechanism of the undulating groove 42a, output ball elements 51b, and output supporters 51.

Because of this configuration, the swing-type speed reducer 1 in this embodiment does not use any gears or the like to reduce the speed of a rotational input, making it possible to miniaturize the device and minimize backlash.

In addition, both the annular swing grooves 33 and the annular precession grooves 34, which require highly precise machining, are formed in the surface of the spherical portion 31 of the precession body 30 in the swing-type speed reducer 1 of this embodiment. These grooves can easily be machined in the surface of the spherical portion 31 using tools in an automatic machining apparatus.

In addition, these grooves can easily be machined using tools in an automatic machining apparatus even on a smaller-diameter spherical portion 31. If these grooves were machined in, for example, the inner circumferential surface of the swinging body 40, interference between the tool and the swinging body 40 would need to be avoiding during machining, thereby reducing the machinable range and making machining more difficult if the device is miniaturized. In this embodiment, precise machining can be achieved by machining the grooves in the surface of the spherical portion 31 even when the device is miniaturized.

Meanwhile, forming the grooves in the surface of the spherical portion 31 makes it possible to place biasing force upon the ball elements for swing motion 40b and precessional ball elements 16b contacting these grooves through the elastic members. The precession body 30 is supported by the precession supporters 16, which are mounted to the bottom plate 13 with the interposed disc springs 16d, and the precessional ball elements 16b. The swinging body 40 is supported by the swing motion supporters 17, which are mounted to the top plate 14 with the interposed disc springs 17d, and the swing motion guide ball elements 17b.

Therefore, even if a heavy load is placed upon the swing-type speed reducer 1 and its various parts, the load upon the precession body 30 and the swinging body 40 is absorbed by the disc springs 17d and the disc springs 16d, respectively, making it possible to minimize any effects thereupon. It is thus possible to improve the load resistance and durability of the swing-type speed reducer 1.

Figure 10:
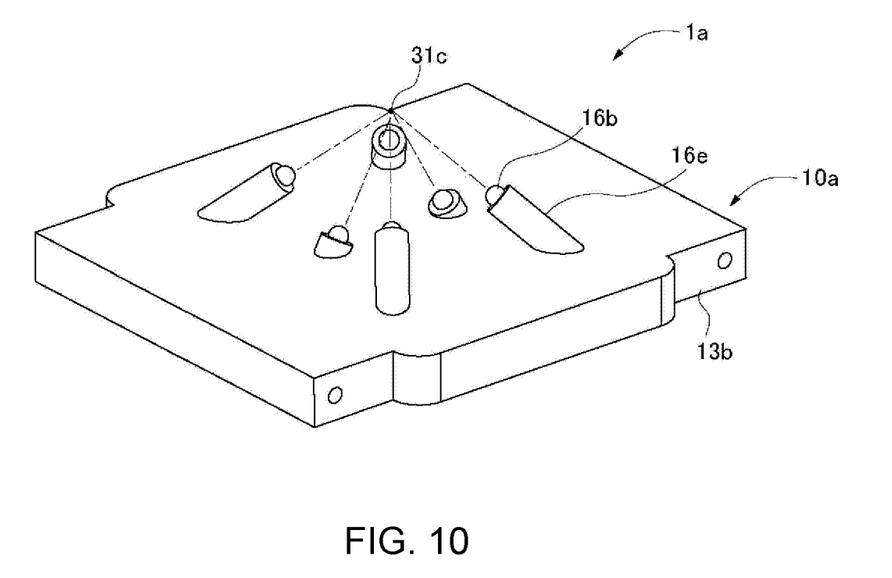
FIG. 10 An explanatory illustration of a modified example of a precession supporter.

Next, a modified example of the swing-type speed reducer of this embodiment will be described with reference to FIG. 10. FIG. 10 depicts precession supporters 16e of a swing-type speed reducer 1a constituting a modified example. The precession supporters 16e in FIG. 10 are cylindrical elements on a bottom plate 13b of a main body 10a that extend toward the center 31C of the spherical portion 31 of the precession body 30. In the description of this modified example, elements identical to those used in the embodiment described above will be labeled identically, and detailed description thereof will be omitted.

The precession supporters 16e in this modified example are basically cylindrical in shape, and the precessional ball elements 16b are rotatably held in the ends thereof. The precession supporters 16e are mounted to the bottom plate 13b with interposed disc springs, as in the embodiment described above, and are capable of axial movement relative to the bottom plate 13b. Alternatively, the precession supporters 16e may be biased toward the annular precession grooves 34 by another biasing means, such as coil springs.

Because of the configuration of the precession supporters 16e in this modified example, even if the output shaft 50 places a heavy load upon the precession body 30, the precession supporters 16e and biasing means are capable of uniformly dispersing and absorbing the load upon the precession body 30.

While the angle α between the input axis 20A of the input shaft 20 and the precession axis 30A of the precession body 30 is 10° in the embodiments described above, this is not limiting, and various modifications to the size and reduction ratio of the device as a whole are possible as long as the angle is in a range of 0°<α≤20°.

The cross angle between the input axis 20A and the output axis 50A is 90° in the embodiments described above, but is not limited thereto, and can be altered within a range of ±20°. The number and shapes of the annular swing grooves 33 and annular precession grooves 34 provided in the surface of the spherical portion 31 of the precession body 30 can also be modified, as appropriate, according to the size, etc., of the spherical portion 31.

1, 1a: swing-type speed reducer, 10, 10a: main body, 11: front plate, 12: rear plate, 13, 13b: bottom plate, 14: top plate, 15 input bearing, 16: precession supporter, 16a: recess, 16b: precession ball element, 16d: disc spring, 17: swing motion supporter, 17b: swing motion guide ball element, 17c: anchoring element, 17d: disc spring, 20: input shaft, 20A: input axis, 21: shaft part, 21: precessional shaft, 22: eccentric part, 23: precession bearing, 24: eccentric bearing, 30: precession body, 30A: precession axis, 31: spherical portion, 31C: center, 32: precessional shaft, 33: annular swing groove, 34: annular precession groove, 40: swinging body, 40a: recess, 40A: swing motion axis, 40b: ball element for swing motion, 41: supported part, 41a: swing guide groove, 42: guide, 42a: undulating groove, 42b: arc-shaped groove, 50: output shaft, 50A: output axis, 51: output supporter, 51a: recess, 51b: output ball element.

What is claimed is:

1. A swing speed reducer comprising:

an input shaft rotatably supported by a main body around an input axis extending in the X-axis in an X-Y-Z coordinate system;

a precession body comprising a spherical portion and a pair of precessional shafts projecting from both sides of the spherical portion along a precession axis passing through the center of the spherical portion, with one of the precessional shafts being held by the input shaft so as to be capable of precessing around the X-axis;

a precession supporter for supporting the precession body so as to enable precessional motion of the precession body relative to the main body, wherein the precession supporter is anchored to the main body;

a swinging body that, in the Z-axis direction, engages with the surface of the precession body on the opposite side from the precession supporter and is swung by the precessional motion of the precession body;

a swing motion supporter that engages with the swinging body and supports the swing motion of the swinging body relative to the main body;

and an output shaft rotatably supported by the main body around the Z-axis direction, wherein the output shaft engages with the swinging body so as to be rotated by the swing motion of the swinging body, wherein an annular precession groove that follows a locus traced between the precession body and the precession supporter when the precession body is in precessional motion is provided in the surface of the precession body facing the precession supporter, and a precessional ball element that rolls through the annular precession groove is rotatably held by the precession supporter, wherein an annular swing groove that causes the swinging body to swing in the circumferential direction around the Z-axis and in the Z-axis direction when the precession body is in precessional motion is provided in the surface of the precession body facing the swinging body, and a ball element for swing motion that rolls through the annular swing groove is rotatably held by the surface of the swinging body facing the precession body, wherein a swing guide groove for guiding the swing motion of the swinging body is provided in the surface of the swinging body facing the swing motion supporter, and a swing motion guide ball element that rolls through the swing guide groove is rotatably held by the swing motion supporter, and wherein an undulating groove formed by a plurality of continuous arc-shaped grooves for one period of the swing motion of the swinging body is provided around the entire circumference of the surface of the swinging body facing the output shaft, and output ball elements that roll through the undulating groove are rotatably held by the output shaft.

2. The swing speed reducer according to claim 1, wherein the precession supporter is mounted on the main body via an elastic member and provided with a precession biasing means for biasing the precessional ball element toward the annular precession groove.

3. The swing speed reducer according to claim 2, wherein the precession supporter biases the precessional ball element in the annular precession groove toward the center of the spherical portion.

4. The swing speed reducer according to claim 1, wherein the swing motion supporter is mounted on the main body via an elastic member and provided with a swing motion biasing means for biasing the swing motion guide ball element toward the swing guide groove.

* * * * *